(12) United States Patent
Weh et al.

(10) Patent No.: US 11,318,921 B2
(45) Date of Patent: May 3, 2022

(54) PISTON PUMP UNIT FOR A HYDRAULIC VEHICLE BRAKING SYSTEM

(71) Applicant: Robert Bosch GmbH, Stuttgart (DE)

(72) Inventors: Andreas Weh, Sulzberg (DE); Matthias Mayr, Rettenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/639,873

(22) PCT Filed: Jul. 19, 2018

(86) PCT No.: PCT/EP2018/069624
§ 371 (c)(1),
(2) Date: Feb. 18, 2020

(87) PCT Pub. No.: WO2019/037965
PCT Pub. Date: Feb. 28, 2019

(65) Prior Publication Data
US 2020/0361434 A1 Nov. 19, 2020

(30) Foreign Application Priority Data

Aug. 24, 2017 (DE) .................... 10 2017 214 859.4

(51) Int. Cl.
| | |
|---|---|
| *B60T 8/40* | (2006.01) |
| *F04B 9/04* | (2006.01) |
| *F04B 17/03* | (2006.01) |
| *B60T 13/74* | (2006.01) |
| *F04B 53/06* | (2006.01) |

(Continued)

(52) U.S. Cl.
CPC .......... *B60T 8/4022* (2013.01); *B60T 13/745* (2013.01); *F04B 9/04* (2013.01); *F04B 17/03* (2013.01); *F04B 53/06* (2013.01); *F04B 53/16* (2013.01); *B60T 8/368* (2013.01)

(58) Field of Classification Search
CPC ...... B60T 8/368; B60T 8/4022; B60T 13/745; F04B 9/04; F04B 17/03; F04B 53/06; F04B 53/16
See application file for complete search history.

(56) References Cited

U.S. PATENT DOCUMENTS

| | | | |
|---|---|---|---|
| 6,220,675 B1 * | 4/2001 | Steffes | .................... B60T 8/341 303/11 |
| 9,440,629 B2 * | 9/2016 | Ohnishi | .................. B60T 7/042 |

(Continued)

FOREIGN PATENT DOCUMENTS

| | | |
|---|---|---|
| CN | 104837696 A | 8/2015 |
| DE | 102014225595 A1 | 6/2016 |

(Continued)

OTHER PUBLICATIONS

International Search Report for PCT/EP2018/069624, dated Sep. 28, 2018.

*Primary Examiner* — Patrick Hamo
(74) *Attorney, Agent, or Firm* — Norton Rose Fulbright US LLP; Gerard Messina

(57) ABSTRACT

A piston pump unit for a hydraulic vehicle power braking system including an electric motor, a planetary gear set, a worm gear, and a piston displaceable in a cylinder. As ventilation of an annular gap between the cylinder and the piston and a back side of the piston, the invention provides a radial hole and grooves in the cylinder.

15 Claims, 1 Drawing Sheet

(51) Int. Cl.
*F04B 53/16* (2006.01)
*B60T 8/36* (2006.01)

(56) References Cited

U.S. PATENT DOCUMENTS

2014/0373526 A1* 12/2014 Ohnishi ............... B60T 13/146
  60/545
2018/0326959 A1* 11/2018 Micke .................. B60T 8/4081
2019/0047531 A1*  2/2019 Nagel .................. B60T 13/575

FOREIGN PATENT DOCUMENTS

| DE | 102015214585 A1 | 2/2017 |
| DE | 102015222286 A1 | 5/2017 |
| EP | 2762371 A1 | 8/2014 |
| WO | 9842553 A1 | 10/1998 |

* cited by examiner

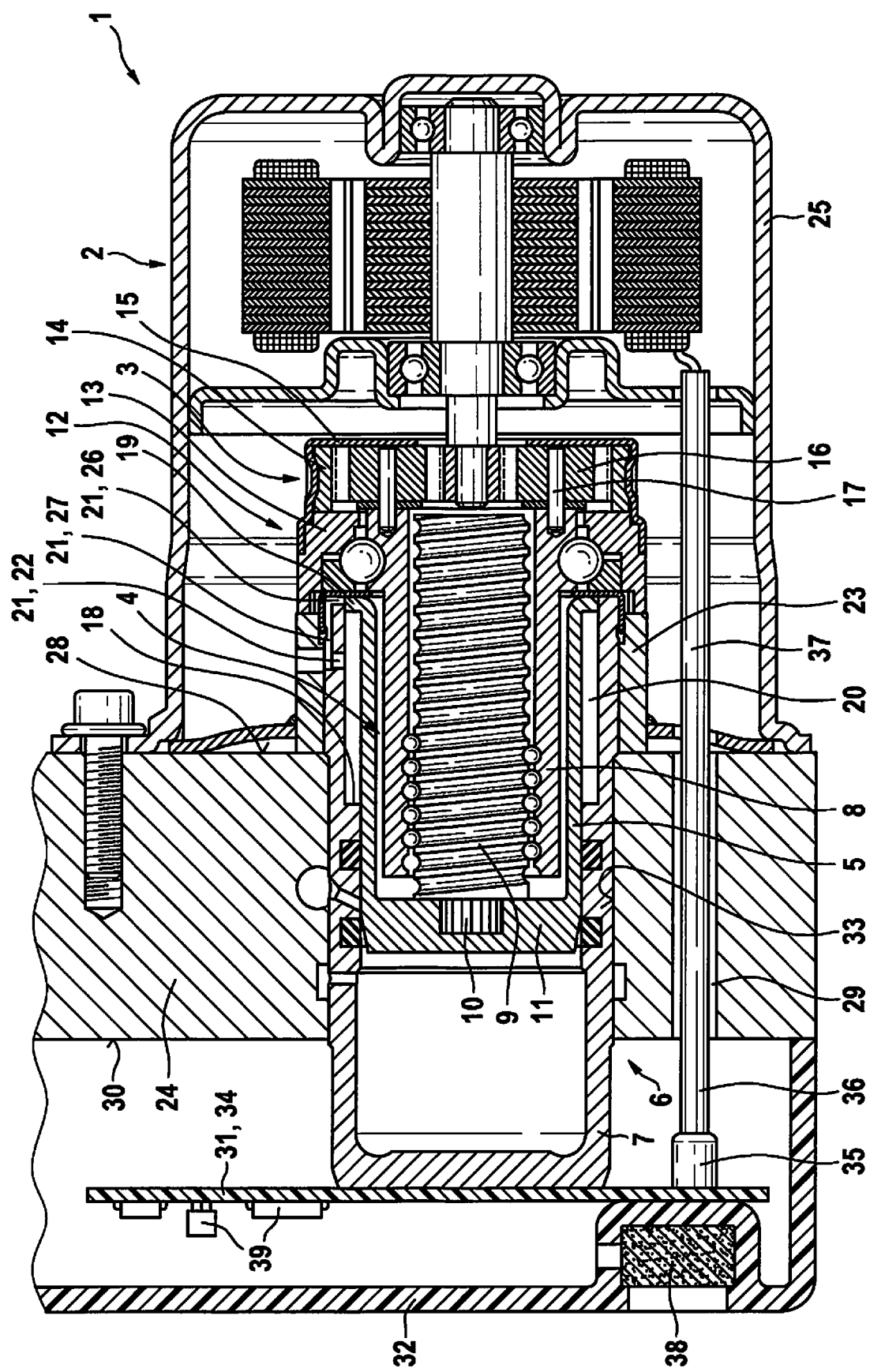

PISTON PUMP UNIT FOR A HYDRAULIC VEHICLE BRAKING SYSTEM

FIELD OF THE INVENTION

The present invention relates to a piston pump unit for a hydraulic vehicle braking system.

BACKGROUND INFORMATION

Piston pumps are utilized in hydraulic vehicle power braking systems for generating a hydraulic brake pressure for a service brake application with the aid of external power and/or in anti-slip-regulated vehicle braking systems also for generating a brake pressure and for conveying brake fluid out of wheel brakes, after a pressure reduction, back to the wheel brakes in order to increase the wheel brake pressures again, or back in the direction of a main brake cylinder during an anti-slip regulation.

SUMMARY OF THE INVENTION

The piston pump unit according to the present invention having the features described herein is provided for generating a brake pressure and/or for conveying brake fluid in a hydraulic vehicle power braking system and/or an anti-slip-regulated vehicle braking system. The piston pump unit includes an electric motor as the drive, a worm gear, for example, a spindle gear unit, which converts a rotating drive motion of the electric motor into a translatory motion, and a piston-cylinder unit, whose piston is displaceable in the cylinder with the aid of the worm gear. This involves a relative motion between the piston and the cylinder; the cylinder may also be displaced on the piston. A reduction gear, for example, a planetary gear set, may be connected between the electric motor and the worm gear.

An underpressure may develop during a working stroke of the piston of the piston-cylinder unit and, during a return stroke, an overpressure may develop on a back side of the piston. The working stroke is the stroke, during which the piston displaces brake fluid out of the cylinder of the piston-cylinder unit, and the return stroke is the stroke in the opposite direction, during which the piston draws brake fluid into the cylinder. The back side is the side of the piston, which is not acted upon by brake fluid, or which, at least, is not utilized for the displacement and the drawing-in of brake fluid.

In order to avoid or reduce an underpressure or overpressure on the back side of the piston, the present invention provides a radial ventilation of the cylinder, with the aid of which the back side of the piston communicates with a larger volume—with an interior space of a motor housing of the electric motor, in one embodiment of the present invention—or possibly with the surroundings.

The present invention prevents, for example, air—which the piston of the piston-cylinder unit of the piston pump unit "pumps" via its back side during a reciprocating motion back and forth in the cylinder—from flowing through a rolling bearing, which is situated at an open end of the cylinder for a pivotal bearing of the worm gear. Such air blown through the rolling bearing could blow a lubricant out of the pivot bearing in the direction of the electric motor and/or draw a lubricant into the cylinder of the piston-cylinder unit, both of which are undesirable. One part of the worm gear, normally a spindle or a nut, is pivotably mounted. The present invention is not limited, however, to piston pump units, which include such a pivot bearing.

The subject matter of the subclaims are advantageous embodiments and refinements of the present invention described herein.

The present invention is explained in greater detail in the following with reference to a specific embodiment represented in the drawing.

BRIEF DESCRIPTION OF THE DRAWING

The sole FIGURE shows an axial section of a piston pump unit according to the present invention.

DETAILED DESCRIPTION

Piston pump unit 1 according to the present invention, represented in the drawing, is provided for generating pressure in a hydraulic vehicle power braking system and/or for generating pressure and for conveying brake fluid in an anti-slip-regulated hydraulic vehicle braking system during an anti-slip regulation. Such anti-slip regulations are, for example, anti-lock systems, drive-slip regulations, vehicle dynamics regulations, and electronic stability programs, for which the abbreviations ABS, ASR, VDR, and ESP are common.

For driving, piston pump unit 1 according to the present invention includes an electric motor 2, with the aid of which a planetary gear set 3 is drivable. Planetary gear set 3 drives a worm gear 4 in a rotating manner; worm gear 4 converts the rotary motion into a displacement in order to displace a piston 5 of a piston-cylinder unit 6 in a cylinder 7. Piston 5 is axially displaceable in cylinder 7; a displacement direction of piston 5 in cylinder 7 is, therefore, axial or axially parallel. In the described and explained specific embodiment of the present invention, worm gear 4 is a ball screw. Planetary gear set 3, which may also be generally construed as a reduction gear, drives a nut 8 of worm gear 4 in a rotating manner and nut 8 displaces a spindle 9 of worm gear 4. In deviation therefrom, conversely, spindle 9 may also be driven in a rotating manner and nut 8 may be displaced together with piston 5. An end of spindle 9 remote from planetary gear set 3 and electric motor 2 is connected to piston 5 via a journal 10 integral therewith, which has been pressed into a blind hole in a piston base 11 of piston 5, so that piston 5 is displaced along with spindle 9. Piston 5 is configured as a hollow piston, which is closed, as one piece, by its piston base 11 at an end remote from planetary gear set 3 and electric motor 2 and is open at an end facing planetary gear set 3 and electric motor 2. Worm gear 4 is situated in piston 5 of piston-cylinder unit 6, which is configured as a hollow piston. The aforementioned components of piston pump unit 1, i.e., electric motor 2, planetary gear set 3 situated between electric motor 2 and worm gear 4, worm gear 4, piston 5, and cylinder 7 are coaxial.

Nut 8 of worm gear 4 is pivotably mounted with the aid of a pivot bearing 12, whose outer ring 13 is situated at an open front face of cylinder 7, which faces planetary gear set 3 and electric motor 2. In the described and represented specific embodiment of the present invention, pivot bearing 12 is a ball bearing, i.e., a rolling bearing.

Planetary gear set 3 is situated between piston-cylinder unit 6 or, more precisely, between pivot bearing 12 and electric motor 2. In the represented and described specific embodiment of the present invention, an annulus gear 14 of planetary gear set 3 is fastened, with the aid of a cup-shaped holder 15, to a side of outer ring 13 of pivot bearing 12 facing electric motor 2. Nut 8 of worm gear 4 forms a planet carrier of planetary gear set 3; on its front face facing electric motor 2, planet wheels 16 of planetary gear set 3 are pivotably mounted with the aid of cylindrical pins 17.

Cylinder 7 widens inwardly via an annular step 18 in the direction of its open front end facing electric motor 2. Piston 5 encompasses, on its open front end facing electric motor 2, an outwardly projecting flange 19, which engages into the diameter widening of cylinder 7. As a result, an annular gap 20 is formed between piston 5 and cylinder 7, whose volume changes during a stroke of piston 5, i.e., during an axial motion of piston 5 in cylinder 7.

For the purpose of a pressure compensation, cylinder 7 includes a ventilation 21, which, in the represented and described specific embodiment of the present invention, includes a radial hole 22, which extends through a circumferential wall of cylinder 7 and opens into annular gap 20. Radial hole 22 also extends through a tubular collar 23, with the aid of which cylinder 7 is fastened to a hydraulic block 24. Ventilation 21 extends into a motor housing 25 of electric motor 2.

Additionally, cylinder 7 includes, in its open front end facing electric motor 2, a radial groove 26, which transitions into an axially parallel groove 27 outward in the circumferential wall of cylinder 7 and opens into radial hole 22 in the circumferential wall of cylinder 7 and collar 23. Due to grooves 26, 27, which are also a ventilation 21 or part of ventilation 21 of the back side of piston 5 or of cylinder 7, there is a pressure compensation of a back side or of an interior space of piston 5 configured as a hollow piston and whose volume changes during a stroke. The back side of piston 5 is the side, which is not acted upon by brake fluid and which does not displace or draw in any brake fluid out of or into cylinder 7. In the case of piston 5, configured as a hollow piston, of the represented and described specific embodiment of the present invention, the back side of piston 5 is the interior space of piston 5.

Ventilation 21 or the pressure compensation of annular gap 20 between cylinder 7 and piston 5 and the back side or the interior space of piston 5 takes place, as explained, in motor housing 25 of electric motor 2. The situation is avoided in which piston 5, during its stroke, "pumps" air through the pivot bearing 12, which, in the represented and described specific embodiment of the present invention, is a rolling bearing, namely a ball bearing and, in the process, blows lubricant out of pivot bearing 12 in the direction of electric motor 2 or draws lubricant into the interior space of piston 5 and into cylinder 7.

It is not necessary for ventilation 21 to include a radial hole 22 and radial groove 26 as well as axially parallel in groove 27. Other ventilations of annular gap 20 between piston 5 and cylinder 7 and/or the back side of piston 5 are possible.

During a stroke of piston 5, spindle 9 of worm gear 4 moves axially in nut 8 and, in the process, acts similarly to a piston: Spindle 9 draws in air and, during a motion in the opposite direction, displaces the air out of an interior space of nut 8. The interior space of nut 8 or, generally speaking, worm gear 4, includes a ventilation through the gear wheels of planetary gear set 3 into motor housing 25 of electric motor 2. The ventilation of the interior space of nut 8 of worm gear 4 does not take place through pivot bearing 12.

Piston pump unit 1 according to the present invention is situated at or in hydraulic block 24 of a brake pressure regulation and anti-slip regulation of an otherwise not represented hydraulic vehicle power braking system. Such anti-slip regulations, such as an anti-lock system, drive-slip regulation, and vehicle dynamics regulation/electronic stability programs, for which the abbreviations ABS, ASR, and VDR/ESP are common, and hydraulic blocks 24 are known, per se, to those skilled in the art and are not explained in greater detail here. Hydraulic block 24 is utilized for a mechanical fastening and a hydraulic interconnection of hydraulic, electrohydraulic, and electronic components of the brake pressure regulation and anti-slip regulation, which include, in addition to piston pump unit 1, solenoid valves, check valves, hydraulic accumulators, and damper chambers, which are situated in and at hydraulic block 24 and are hydraulically connected to one another via a bore hole (not shown) of hydraulic block 24. Equipped with piston pump unit 1 and the further components of the brake pressure regulation and the anti-slip regulation, hydraulic block 24 forms a hydraulic unit, which is part or a core piece of the brake pressure regulation and anti-slip regulation. During a service brake application, a brake pressure of the vehicle braking system is generated via external power with the aid of piston pump unit 1 according to the present invention. During an anti-slip regulation, piston pump unit 1 generates a brake pressure and/or conveys brake fluid, after a reduction of a brake pressure, back into hydraulic wheel brakes (not shown) of the vehicle braking system or in the direction of a main brake cylinder or a brake fluid reservoir (also not shown).

Cylinder 7 of piston pump unit 1 according to the present invention is situated in a through-hole of hydraulic block 24, out of which it projects, on both sides. The through-hole forms a receptacle 33 for cylinder 7 of piston-cylinder unit 6 of piston pump unit 1 according to the present invention. Electric motor 2 is fastened to one side of hydraulic block 24, which is referred to as motor side 28 in this case. The interior space of motor housing 25 is ventilated through a through-hole 29, which extends from motor side 28 to a diametrically opposed side of hydraulic block 24, which is referred to here as control unit side 30. An electronic control unit 31 is situated in a control unit housing 32 on control unit side 30. Control unit 31 is shown as a circuit board 34 equipped with electronic components 33 and regulates the hydraulic and electrohydraulic components of the brake pressure regulation and anti-slip regulation, including electric motor 2 of piston pump unit 1 according to the present invention and of the hydraulic unit.

Electronic control unit 31 includes a multipole, electrical plug coupling 35, into which a multipole plug 36 of electric motor 2 has been inserted. Plug 36 is located at an end of a plug bar 37 remote from electric motor 2, which protrudes from electric motor 2 in an axially parallel manner and extends through through-hole 29 in hydraulic block 24. Plug bar 37 is a rigid plastic casing of electrical terminal lines and commutation lines of electric motor 2. Plug bar 37 has a smaller diameter than through-hole 29 in hydraulic block 24, so that through-hole 29 is utilized, in addition for the passage of terminals of electric motor 2, for the ventilation of the interior space of motor housing 25 of electric motor 2.

Therefore, annular gap 20 between cylinder 7 and piston 5 of piston-cylinder unit 6 and the back side or the interior space of piston 5 configured as a hollow piston and the interior space of nut 8 of worm gear 4 or, generally speaking, the worm gear 4 communicate with the interior space of motor housing 25 of electric motor 2 and, through through-hole 29 in hydraulic block 24, with an interior space of control unit housing 32, whose volumes are greater than a volume change in annular gap 20 around piston 5 and on the back side of piston 5 and of worm gear 4 during a piston stroke, whereby annular gap 20, the back side of piston 5, and worm gear 4 are ventilated. Control unit housing 32 includes a porous filter element as pressure compensation element 38, with the aid of which the interior space of control unit housing 32 communicates with the surroundings. As a result, a pressure compensation takes place when there is a changing ambient pressure.

What is claimed is:

1. A piston pump unit for a hydraulic vehicle braking system, comprising:
    an electric motor;
    a worm gear, which is rotatably drivable by the electric motor to convert a rotary motion of the electric motor into a displacement; and
    a piston-cylinder unit, which includes a piston, which is displaceable with the worm gear in a cylinder;
    wherein the cylinder includes a radial ventilation of at least one of:
        (I) an annular gap between the cylinder and the piston, and at least one of the following features (a)-(c):
            (a) the radial ventilation provides for ventilation of air from the annular gap into an area that is radially exterior to the cylinder and from which braking fluid is not suppliable to wheel brakes;
            (b) the radial ventilation includes two radially extending channels within a wall that vent, at a radially exterior end of the channels, into an interior space of a housing of the electric motor beyond the wall; and/or
            (c) the worm gear includes a spindle and nut that rotate relative to each other and one of which is arranged within the other, and at least one of the following features (i)-(ii):
                (i) a part of the spindle and a part of the nut are located at an axial position of the radial ventilation; and
                (ii) at least part of the spindle and at least part of the nut are arranged within the piston; and
        (II) an area into which an interior of the piston opens at a back side of the piston, at least a portion of the piston being arranged in front of the worm gear.

2. The piston pump unit of claim 1, wherein a pivot bearing for the worm gear is situated at an end of the cylinder facing the electric motor and the ventilation is located on a side of the pivot bearing facing away from the electric motor.

3. The piston pump unit of claim 1, wherein the ventilation includes a radial hole that opens into the annular gap.

4. The piston pump unit of claim 1, wherein a radially exterior end of the ventilation communicates with an interior space of a motor housing of the electric motor.

5. The piston pump unit of claim 1, wherein the cylinder is accommodated in a receptacle of a hydraulic block, at which the electric motor is situated.

6. The piston pump unit of claim 1, wherein the hydraulic block includes a ventilation for a motor housing of the electric motor.

7. The piston pump unit of claim 1, wherein the radial ventilation includes the two radially extending channels.

8. The piston pump unit of claim 7, wherein the two radially extending channels are formed within the wall and vent, at the radially exterior end of the channels, into the interior space of the housing of the electric motor beyond the wall.

9. The piston pump unit of claim 1, wherein the radial ventilation is of the annular gap between the cylinder and the piston for ventilation of air from the annular gap into the area that is radially exterior to the cylinder and from which braking fluid is not suppliable to the wheel brakes.

10. The piston pump unit of claim 1, wherein the worm gear includes the spindle and nut that rotate relative to each other and one of which is arranged within the other, and the part of the spindle and the part of the nut are located at the axial position of the radial ventilation.

11. The piston pump unit of claim 10, wherein a part of the piston is located at the axial position of the radial ventilation.

12. The piston pump unit of claim 1, wherein a part of the piston is located at an axial position of the radial ventilation.

13. The piston pump unit of claim 1, wherein the worm gear includes the spindle and the nut that rotate relative to each other, and at least part of the spindle and at least part of the nut are arranged within the piston.

14. The piston pump unit of claim 1, wherein the ventilation includes a groove that extends radially through a wall of the cylinder.

15. The piston pump unit of claim 1, wherein the radial ventilation is of the area into which the interior of the piston opens at the back side of the piston, and the at least the portion of the piston is arranged in front of the worm gear.

* * * * *